(12) United States Patent
Cassarly et al.

(10) Patent No.: US 6,192,176 B1
(45) Date of Patent: Feb. 20, 2001

(54) COMPACT OPTICAL SYSTEM WITH TURN AND COLOR MIXING

(75) Inventors: William J. Cassarly, Lyndhurst; Richard L. Hansler, Pepper Pike; John M. Davenport, Lyndhurst; Richard C. Nagle, North Royalton, all of OH (US)

(73) Assignee: General Electric Company, Schenectady, NY (US)

( * ) Notice: Under 35 U.S.C. 154(b), the term of this patent shall be extended for 0 days.

(21) Appl. No.: 09/027,663

(22) Filed: Feb. 23, 1998

(51) Int. Cl.[7] ................................................ G02B 6/26
(52) U.S. Cl. ................................ 385/32; 385/43; 385/31; 385/901
(58) Field of Search .................................. 385/31–34, 43, 385/901; 362/32

(56) References Cited

U.S. PATENT DOCUMENTS

| | | | |
|---|---|---|---|
| 5,341,445 | 8/1994 | Davenport et al. | 385/39 |
| 5,406,462 | * 4/1995 | Fallahi et al. | 362/32 |
| 5,416,669 | * 5/1995 | Kato et al. | 362/32 |
| 5,436,806 | 7/1995 | Kato | 362/32 |
| 5,469,337 | 11/1995 | Cassarly et al. | 362/32 |
| 5,479,545 | 12/1995 | Davenport et al. | 385/43 |
| 5,575,551 | 11/1996 | Horii | 362/32 |
| 5,691,696 | 11/1997 | Mazies et al. | 340/471 |

* cited by examiner

*Primary Examiner*—John D. Lee
*Assistant Examiner*—Juliana K. Kang
(74) *Attorney, Agent, or Firm*—Christine K. Garcia; Li-Hua Luo

(57) ABSTRACT

A compact optical assembly includes a tight bend region that effectively propagates light from a source to an end use while maximizing beam lumens, improving color mixing, and minimizing complexity. A first nonimaging optical component increases the angular distribution of light from the source to an input end of the bend region having a light fiber with a first cross-sectional dimension. A second nonimaging optical component receives light from the bend region and decreases the angular distribution. A light conductor that interconnects the light source to the first nonimaging optical component has a cross-sectional dimension in the plane of the bend region greater than that of the light fiber and, likewise, a second conductor receiving light from the second nonimaging optical component has a cross-sectional dimension in the plane of the bend region greater than the light fiber.

28 Claims, 3 Drawing Sheets

COMPACT OPTICAL SYSTEM WITH TURN AND COLOR MIXING

BACKGROUND OF THE INVENTION

This application is directed to optically coupling a high brightness light source to a remote end use via a light conductor and, more particularly, to an optical system that provides improved light mixing and more uniform light intensity and color.

The invention is particularly applicable to optical systems of the type as shown and described in U.S. Pat. No. 5,341,445—Davenport, et al.; 5,469,337—Cassarly, et al.; and 5,691,696—Mazies, et al. The details of the '445; '337; and '696 patents are incorporated herein by reference. Generally, these patents disclose a high brightness light source, for example one measuring in excess of 50,000 lumens per square centimeter, associated with a reflector arrangement that inputs light to one or more optical light conductors, pipes or fibers. Light enters the individual light fibers through suitable coupling members which collect light that would normally fall outside of an input surface area of a light fiber and exits at an opposite end thereof for use at a remote location.

Selected applications of these types of systems require a light fiber to undergo a tight bend, for example, when turning a corner. A commercial embodiment exhibiting this requirement is an automotive lighting system where the light source is located in a central location such as under the engine hood. The headlights are located on either side of the engine compartment and directed forwardly of the vehicle, thus, necessitating that the light fibers undergo a bend or turn to direct the light in a forward direction.

This bend of the light fibers can approach 105 degrees in a small area, for example, a two-by-two inch box which adversely affects optical transmission. Heretofore, such a tight bend would adversely impact on light output from the headlamp system. Intensity or angular distribution and illuminance or spatial distribution are both impacted. Ideally, the turn must be accomplished with no significant loss and no significant increase in the angular distribution.

By of way of example, a Teflon clad light fiber of a diameter of 0.5 inches is difficult to bend through a small radius in a headlamp assembly. The cladding surrounding the core material starts to kink at a bend radius of approximately four inches. Moreover, brightness significantly decreases at a bend radius of about seven inches.

One attempt to solve these problems was to remove the cladding from a portion of the fiber in the bend region. Without the cladding, negligible light was lost but the angular distribution was still severely distorted. The main portion of light exiting the light fiber was shifted by about ten degrees, a dark spot was found on-axis, and significant radiant energy was thrown to higher angles. This led to an unacceptable reduction in both peak candelas and total lumens out of the headlamp.

Yet another problem associated with high intensity discharge light sources is significant color separation. Typically, the light has a red perimeter with a white interior portion as described in the '445patent. One proposed solution to the color separation as disclosed in the '445 patent is to use a square coupler. The square coupler provides for mixing of the intensity and color of the light as it travels through the square coupler. The polygonal-shaped square coupler provides an increased number of internal reflections per unit length thereby achieving a more uniform distribution of the light intensity and improved color mixing over that achieved with a standard, cylindrical tubular coupling member.

Color separation is also a problem when two independent light sources are used. For example, where two independent sources are used, there are presently no solutions that provide high performance, i.e., long life, minimal complexity, maximum beam lumens, and minimal color separation.

Accordingly, a need exists to address these problems in an inexpensive and effective manner.

SUMMARY OF THE INVENTION

The present invention contemplates a new and improved optical assembly that propagates light from a light source to an associated end use through a tight bend region, providing an assembly that is simple, economical, and effectively implemented.

According to the present invention, there is provided a light fiber having a first cross-section defined in a bend region. A first non-imaging optical component transmits light from the source to a first or input end of the bend region thereby increasing the angular distribution of light through the light fiber. A second non-imaging optical component is disposed to receive light from a second or output end of the bend region and decrease the angular distribution of light.

According to another aspect of the invention, a first conductor transmits light to the output of the first non-imaging optical component and has an input cross-sectional dimension in the plane of the bend greater than that of the light fiber.

According to another aspect of the invention, a second conductor receives light from the output of the second non-imaging component. The second conductor has an input cross-sectional dimension in the plane of the bend greater than the light fiber.

According to yet another preferred aspect of the invention, the non-imaging optical components are tapered light conductors having a first cross-sectional area at one end adjacent the light pipe that tapers to a larger, second cross-sectional area at another end.

In accordance with yet another aspect of the invention, the non-imaging optical components have a cross-sectional configuration selected from a group of polygonal shapes.

A principal advantage of the invention is the ability to bend the light fiber through a tight turn or twist without severely impacting dimensional constraints or optical performance.

Another advantage of the invention resides in improved brightness at the output end of the bend region.

Yet another advantage of the invention is improved color mixing without brightness reduction.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification. The drawings include.

DETAILED DESCRIPTION OF THE PREFERRED EMBODIMENTS

Figure 1:
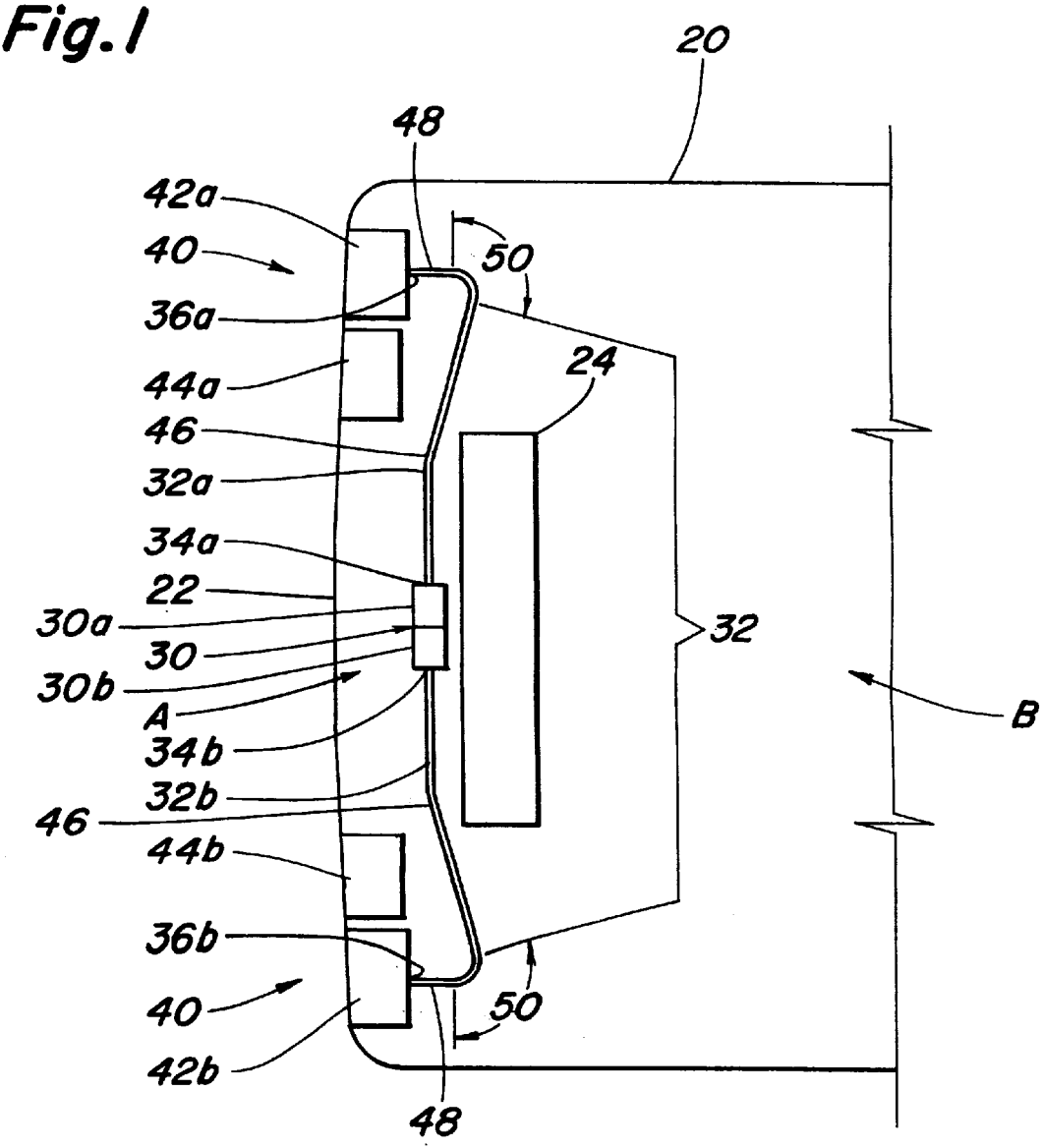
FIG. 1 which is a schematic representation of an automotive vehicle with a central lighting system.

Referring now to the drawings wherein the showings illustrate the preferred embodiments of the invention only and do not limit the invention, the Figures show an optical assembly A that efficiently propagates light from a central source to a remote end use and addresses problems associated with tight bend regions and color mixing. More particularly, an exemplary environment using the principles of this invention is shown as an automotive headlamp system B illustrated in FIG. 1. It will be understood by one skilled in the art that this invention is not limited to this particular environment, however, and may find wide reaching uses in related optical systems. For example, this arrangement may find particular application with backlit displays and instrument panels where the same issues may arise.

FIG. 1 is a schematic representation under the hood of an automotive vehicle 20. Disposed between front end 22 of the vehicle and radiator 24 is a central light source 30. Preferably, the light source is a high brightness light source such as an instant start metal halide lamp or comparable HID source. First and second light pipes or fibers 32a, 32b are optically coupled to the light source 30 to receive light at an input end 34a, 34b and propagate the light to a second or output end 36a, 36b. (For purposes of brevity and convenience, like elements will be referred to with the a and b suffixes and description of one is applicable to the other unless specifically noted otherwise). As is represented in FIG. 1, the end use of the light is disposed at a remote location from the central light source and, because of the use of light fibers, multiple end uses located at spaced positions from one another can all be connected to a single light source. Here, the end use is a headlamp 40 illustrated as discrete low beam and high beam fixtures. The light fiber 32a, 32b propagates the light from the source 30 to the headlamps where light emanating from the fiber is now the source for the headlamp. This type of assembly provides a much smaller cone angle for the light and allows additional optical components to be attached directly to the fiber. This assembly also eliminates problems associated with standard headlamps which require special considerations, due to thermal issues associated with the high temperature light source. Although not shown, it is also understood that light which radiates from the fiber end 36a, 36b is usually collimated and beam forming optics (not shown) are added to provide a desired output pattern. Just as with standard headlamps, various combinations of reflective and refractive optics can be used.

In order to meet dimensional constraints imposed on the optical assembly by the environment, it is sometimes necessary that the fibers form a tight bend region between the source and the end use. Here, for example, tight bend region 50 is disposed adjacent the outlet ends 36b of the fibers just prior to connection with the headlamp. Although this particular embodiment includes a tight bend region that extends through a constant radius R in a single plane, the principles of the present invention need not be so limited. Likewise, the light fiber will be described as having a circular cross-section (referenced by radius r) although the invention applies to fibers of various cross-sectional configuration such as rectangular, oval, or other cross-sections.

As described above, a bent region of the fiber can impact the light distribution from the end of the fiber. The light distribution is often described by parameters such as (i) intensity or angular distribution, (ii) illuminance or spatial distribution, and (iii) total flux out of the fiber. For example, a fiber might encounter a 105 degree turn in a dimensional region defined as a 2"×2" box and the turn must be accomplished with no significant loss and no significant increase in the angular distribution of the light. Again, by way of example only, a twelve millimeter diameter light fiber having a Teflon cladding surrounding the core material starts to kink at a bend radius of approximately four inches. The brightness decreases at a bend radius of approximately seven inches. Removing the cladding resulted in negligible loss of light but the angular distribution was still severely distorted. That is, light was shifted so that a dark spot was found on-axis and significant radiant energy was directed to higher angles resulting in an overall reduction in both peak candelas and total lumens from the headlamp.

Figure 2:
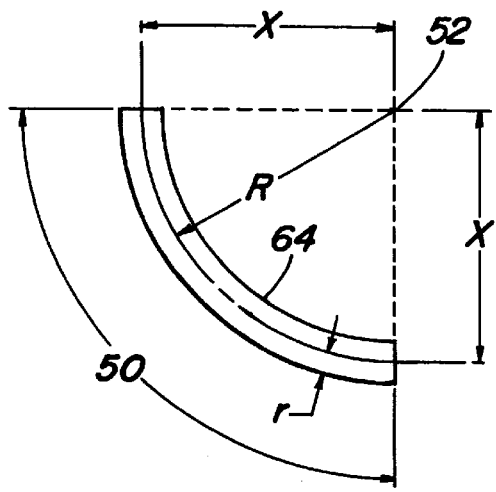
FIG. 2 illustrates a simple bend region of an unclad fiber of radius r shown bent at a radius R of approximately 90 degrees.

FIG. 2 is an enlarged detail of the bend region of the light fiber 32. The light fiber is shown as having a radius r and the degree of bend through the region 50 is represented by radius R defined about axis 52. Of course, the illustrated light fiber is merely representative of a variety of configurations that the fiber can adopt and that are improved by applying the teachings of the subject invention.

Figure 3:
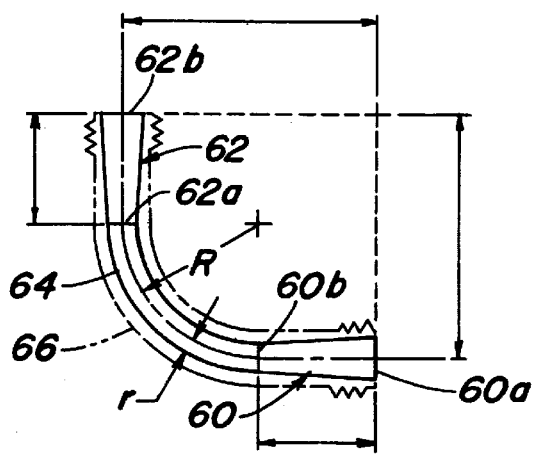
FIG. 3 illustrates a preferred optical assembly designed as a replacement for the bent light fiber of FIG. 2.

FIG. 3 shows a compact optical assembly that can be inserted into the assembly as a unit. For example, comparing the assembly of FIG. 3 with the arrangement of FIG. 2, a box is defined by a length and width of X×X. As described above, bending the fiber results in a loss of brightness where the ratio of the fiber radius r to the bend radius R is small. Stated another way, if the radius of the fiber is relatively large, there is a greater change in the brightness as light propagates through the bend region.

In FIG. 3, however, a smaller diameter or smaller radius fiber is used. At the input end of the bend region is provided a first non-imaging optical component 60. In this preferred embodiment, the first non-imaging optical component is an angle-to-area taper. Similarly, a second non-imaging optical component 62 is provided at the output end of the bend region. Again, the preferred embodiment of FIG. 3 is an angle-to-area taper section. The first tapered component increases the angles as the light propagates from a large diameter end 60a to the small diameter end 60b where the light enters the bent fiber 64 through region 50. The second tapered component subsequently reduces the light angles as the light is transferred from an input end 62a having a small diameter to the large diameter second end 62b.

The higher angles introduced by converting to a smaller diameter fiber 64 in the bend region are less influenced by small changes in the angular distribution. For example, six degrees added to a twenty-six degree angle is much more significant than six degrees added to a forty-two degree angle. Moreover, the higher angles are not changed as much as the lower angles. Thus in the arrangement of FIG. 3, the ratio of the fiber diameter to the bend radius ratio is greater than that in FIG. 2 thereby resulting in a smaller change in brightness through the bend region.

Using a smaller radius light fiber 64 in the bend region allows the bend radius to be smaller and enable its use in a very compact arrangement. The second non-imaging optical component transforms the angular distribution to the spread desired for the end use or continued propagation downstream of the bend region without.

It is also contemplated that these components of the optical assembly be easily manufactured to reduce the cost of the assembly. For example in a preferred arrangement, the bend region, first nonimaging component, and second nonimaging component are all extruded components that are subsequently joined together. Moreover, a boot or dust cover 66 may enclose the optical assembly if desired.

Figure 4:
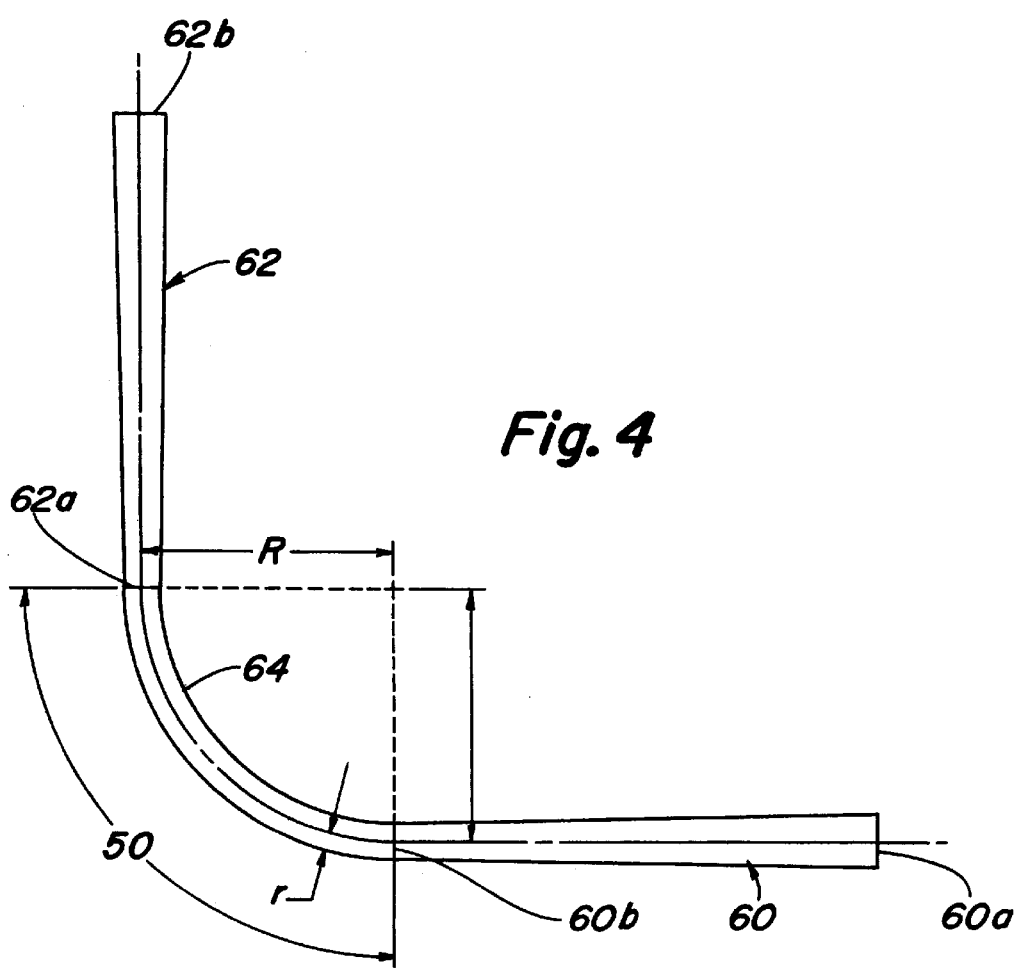
FIG. 4 illustrates another preferred optical assembly for efficiently propagating light through a bend region with angle-to-area tapers at opposite ends of the bend region.

FIG. 4 illustrates an embodiment where the dimensional constraints of the lighting system are not as critical. Accordingly, extended inlead and outlead areas are permitted so that the angle-to-area converter need not be confined to a compact package like in FIG. 3. That is, the same small radius fiber 64 is used but its bend radius R is larger than that in FIG. 3. The angle to area tapers then extend from the opposite ends of the bend region fiber 64.

Generally speaking, as the bend gets tighter there is a resultant increase in the angular distribution. Since a wide angular distribution may not always be desired at the end use, converting the light to lower angular distributions by means of a second non-imaging optical component such as a taper allows a tight bend to still be achieved without sacrificing the desired angular distribution.

An associated benefit with the reduced radius fiber through the bend region and the increase in the angular distribution is the increased color mixing. This is particularly useful where significant color separation is encountered. For example, color separation can occur in systems using independent light sources. Systems with identical light sources or, alternatively, systems employing different types of light sources e.g. a discharge and a halogen light source, or a red light emitting diode and a green light emitting diode, can encounter color separation. As briefly discussed above, high intensity discharge sources provide a red perimeter and a white interior. Moreover, light from different types of light sources has distinctive colors. With the present invention, as the light is propagated through a bend region 50, the high and low angles mix so that a good color mixture results at the output end of the bend region fiber.

Figure 5A:
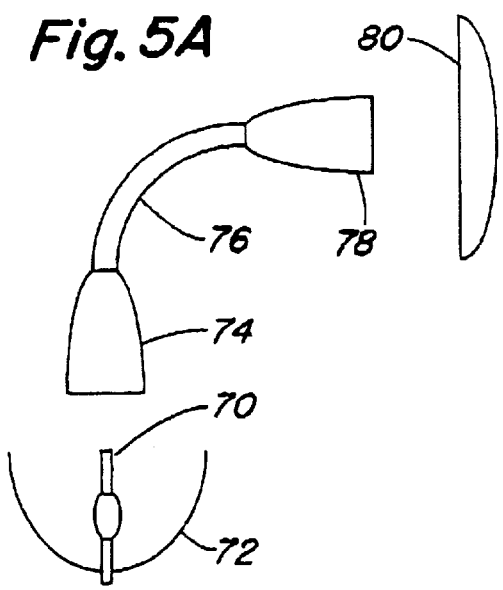
FIGS. 5A and 5B are schematic representations of compact optical systems illustrating different output optical elements.
Figure 5B:
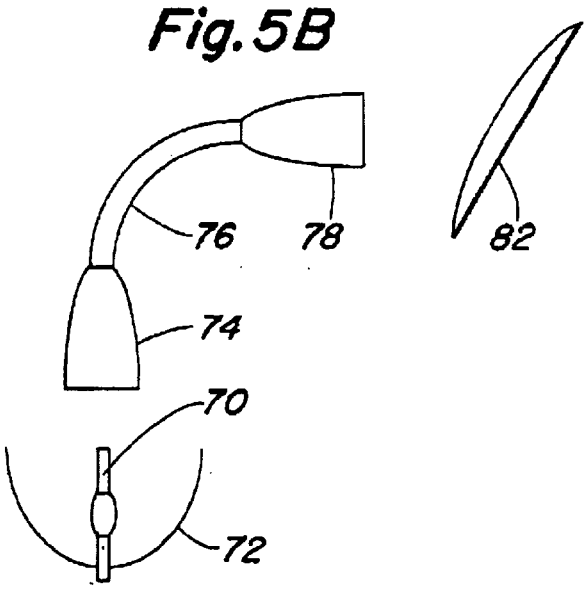
Figure 6A:
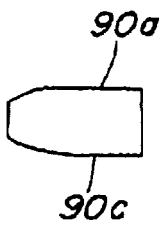
FIGS. 6A, 6B, and 6C illustrate side, end and bottom views, respectively, of a preferred polygonal cross-sectional shape of a non-imaging optical component.
Figure 6B:
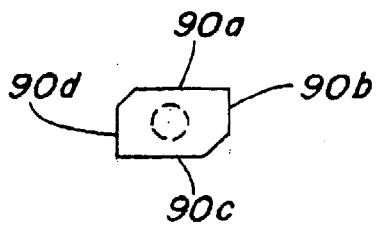
Figure 6C:
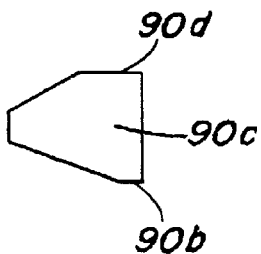
Figure 7A:
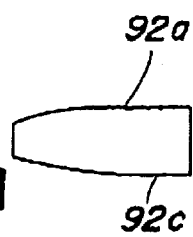
FIGS. 7A, 7B, and 7C illustrate side, end, and bottom views, respectively, of an alternative configuration of a non-imaging optical component.
Figure 7B:
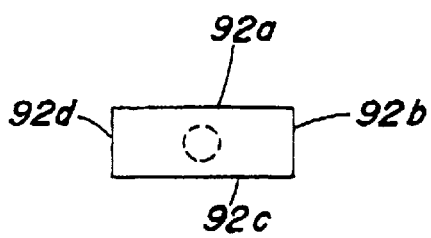
Figure 7C:
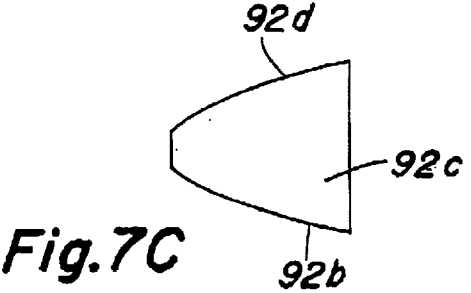

Moreover, FIGS. 5A and 5B demonstrate that the optical assembly is not limited to the automotive vehicle environment. For example, a light source 70 is vertically mounted with an associated reflector 72 in this arrangement. A significant amount of color separation may occur at the input end of the first non-imaging optical component 74. A different angle-to-area converter is used, specifically a compound parabolic collector or CPC which is extremely compact and collects the light and converts it to different angles in a manner well known in the art. The small diameter of the bent light fiber 76 preserves brightness and results in color mixing as described above. The light then proceeds through the second non-imaging optical component 78—here, again, a CPC. The light exits the second CPC and is directed through a lens 80 (FIG. 5A) or a reflective lens 82 (FIG. 5B).

As indicated above, the optical fibers have been described as having a circular cross-section although other cross-sections may be used without departing from the scope and intent of the present invention. FIGS. 6A–6C and 7A–7C likewise illustrate that still other configurations of the non-imaging optical component may be used. For example, the non-imaging optical components may be hollow or solid. The embodiments of FIGS. 6A–6C and FIGS. 7A–7C disclose polygonal perimeters 90a–d, 92a–d, respectively, that provide an effective angle-to-area conversion of the light.

The invention has been described with reference to the preferred embodiments. Obviously, modifications and alterations will occur to others upon a reading and understanding of this specification. It is intended to include all such modifications and alterations insofar as they come within the scope of the appended claims of the equivalents thereof.

What is claimed is:

1. An optical assembly to propagate light from an associated light source to an associated end use through a tight bend region comprising:

a bend region including a light fiber having a first cross-sectional dimension;

a first non-imaging optical component having a first cross-sectional area at a first end greater than a smaller, second cross-sectional area at a second end adjacent the bend, the first non-imaging optical component being operatively disposed to transmit light to the bend region and increase the angular distribution of light through the light fiber; and a second non-imaging optical component operatively disposed to receive light from the bend region and decrease the angular distribution of light, wherein the bend region reduces the distortion of the distribution of light propagated from the associated light source to the associated end use.

2. The optical assembly of claim 1 further comprising a first conductor transmitting light to the first nonimaging optical component and having a cross-sectional dimension greater than the light fiber of the bend region.

3. The optical assembly of claim 2 further comprising a second conductor receiving light from the second nonimaging component and having a cross-sectional dimension greater than the light fiber of the bend region.

4. The optical assembly of claim 1 further comprising a second conductor receiving light from the second nonimaging component and having a cross sectional dimension greater than the light fiber of the bend region.

5. The optical assembly of claim 1 wherein the first nonimaging optical component is a tapered light conductor that has a first cross-sectional area at a first end that tapers to a smaller, second cross-sectional area at a second end adjacent the light fiber.

6. The optical assembly of claim 5, wherein the second nonimaging optical component is a tapered light conductor that has a first cross-sectional area at a first end adjacent the light fiber that tapers to a larger, second cross-sectional area at a second end.

7. The optical assembly of claim 1 wherein the second nonimaging optical component is a tapered light conductor that has a first cross-sectional area at a first end adjacent the light fiber that tapers to a larger, second cross-sectional area at a second end.

8. The optical assembly of claim 1 wherein the second nonimaging optical component has a cross-sectional configuration selected from a group of polygonal shapes that includes a rectangle, square, triangle, and hexagon.

9. The optical assembly of claim 8, wherein the second nonimaging optical component has a solid configuration.

10. The optical assembly of claim 8, wherein the second nonimaging optical component has a hollow configuration.

11. The optical assembly of claim 1 wherein the second nonimaging optical component has a solid configuration.

12. The optical assembly of claim 1 wherein the second nonimaging optical component has a hollow configuration.

13. An optical assembly adapted to efficiently propagate light from an associated light source to an associated end use with improved color mixing comprising:

a bend region having a radius "R" including a light fiber having a radius "r";

a first angle-to-area converter operatively disposed to transmit light to the bend region and increase the angular distribution of light through the light fiber; and a second angle-to-area converter operatively disposed to receive light from the bend region and decrease the angular distribution of light, wherein the bend region reduces the distortion of the distribution of light propagated from the associated light source to the associated end use.

14. The optical assembly of claim 13 further comprising a first conductor transmitting light to the first angle-to-area converter and having a radius greater than the light pipe radius "r" and a second conductor receiving light from the second angle-to-area converter and having a radius greater than the light pipe radius "r".

15. The optical assembly of claim 14 further comprising a light source and a reflector that directs light from the source to the first conductor.

16. The optical assembly of claim 13 wherein the second angle-to area converter has a polygonal cross-sectional configuration.

17. The optical assembly of claim 13 wherein the first and second angle-to-area converters are tapered light pipes.

18. The optical assembly of claim 13 wherein the first and second angle-to-area converters are compound parabolic collectors.

19. The optical assembly of claim 13 further comprising plural light sources that propagate light to the first angle-to-area converter and the small radius light fiber provides improved color mixing of the light from the plural sources.

20. The optical assembly of claim 13 wherein the bend region and the first and second angle-to-area converters are all extrusions.

21. The optical assembly of claim 13 further comprising, a light source wherein the light source is a discharge source.

22. The optical assembly of claim 13 further comprising multiple independent light sources.

23. An optical assembly comprising:

a light source;

a light conductor of a first cross-sectional area having a first end receiving light from the light source and transmitting light to a second end;

a first non-imaging optical component operatively associated with the light conductor second end to receive light therefrom, the first non-imaging optical component having a first cross-sectional area at a first end greater than a smaller, second cross-sectional area at a second end whereby the angular distribution of light is increased as the light passes therethrough;

a tight bend region having a light fiber with a first end receiving light from the second end of the first non-imaging optical component and propagating light to a second end; and a second non-imaging optical component having a first cross-sectional area at a first end and receiving light from the second end of the tight bend region and a second cross-sectional area at a second end whereby the angular distribution of light is decreased as the light passes therethrough, wherein the bend region reduces the distortion of the distribution of light propagated from the light source to the second end of the light conductor.

24. The optical assembly of claim 23 wherein the second nonimaging optical component has a cross-sectional configuration selected from a group of polygonal shapes that includes a rectangle, square, triangle, and hexagon.

25. The optical assembly of claim 24 wherein the second nonimaging optical component has a solid configuration.

26. The optical assembly of claim 24 wherein the second nonimaging optical component has a hollow configuration.

27. The optical assembly of claim 23 wherein the second nonimaging optical component has a solid configuration.

28. The optical assembly of claim 23 wherein the second nonimaging optical component has a hollow configuration.

* * * * *